May 29, 1934.  C. H. HAPGOOD  1,960,702
AUTOMATIC PNEUMATIC PULSATOR FOR MILKING MACHINES
Filed Oct. 29, 1931    2 Sheets-Sheet 1

WITNESS:
Rob R Kitchel.

INVENTOR
Cyrus Howard Hapgood
BY
Busser and Harding
ATTORNEYS.

May 29, 1934.　　　　C. H. HAPGOOD　　　　1,960,702
AUTOMATIC PNEUMATIC PULSATOR FOR MILKING MACHINES
Filed Oct. 29, 1931　　　2 Sheets-Sheet 2

WITNESS:

INVENTOR
Cyrus Howard Hapgood
BY
ATTORNEYS.

Patented May 29, 1934

1,960,702

UNITED STATES PATENT OFFICE 1,960,702

AUTOMATIC PNEUMATIC PULSATOR FOR MILKING MACHINES

Cyrus Howard Hapgood, Nutley, N. J., assignor to The De Laval Separator Company, New York, N. Y., a corporation of New Jersey Application October 29, 1931, Serial No. 571,750

3 Claims. (Cl. 31—62)

The object of the invention is to provide an automatic pneumatic pulsator for milking machines which is operable by means of a continuously operating partial vacuum and the periodicity of whose pulsations may be accurately predetermined.

Prepared embodiments of the invention are shown in the accompanying drawings wherein—

On the milk pail $a$ is mounted a cup $b$ providing a valve chamber on which is mounted a double check valve $c$ controlling an air port connecting the valve chamber with the interior of the pail. Communicating with the valve chamber is a pipe $d$ connected with a source of partial vacuum, whereby a continuous vacuum is produced in the pail; the check valve $c$ preventing the passage of liquid or vapor into the milk pail. The milk chambers of a set of double chambered cups are adapted for connection with the interior of the pail, these connections not being shown. The construction, so far as described, is fully disclosed in the Leitch Patent No. 1,394,433, dated October 18, 1921.

Secured to the cup $b$ is a casing $e$, which is provided with a vacuum passage $f$ registering with an orifice in the cup $b$, whereby this passage is under constant vacuum. Passage $f$ has two oppositely extending branch passages $h$ and $h'$ which communicate respectively with piston valve chambers $i$ and $i'$ at opposite ends of casing $e$.

Between these end valve chambers is an enlarged air chamber $k$.

Slidable in these end valve chambers are the piston valve heads $m$ and $m'$ of a piston valve, which comprises these heads and a connecting stem $g$. Extending from opposite ends of the casing $e$ and communicating respectively with piston chambers $i$ and $i'$, are nozzles $o$ and $o'$. In the circumferential wall of the piston chambers $i$, $i'$ and extending from the outer ends thereof inward a distance greater than the length of the corresponding piston valve heads $m$ or $m'$ are grooves $n$ and $n'$ affording air passages.

Swingable on a stud $p$ extending through one wall of the casing $e$ is a top-heavy oscillatory frame $t$ so weighted that it tends to assume one or the other of its extreme positions. Its periodicity of oscillation may be varied by adjusting stud $p$ vertically in the slot $s$, the stud being held in its adjusted position by means of a nut $r$. A bar $v$ carried by the swinging frame $t$ has a forked flange $w$ engaging a disc $x$ secured to the stem $g$ of the pulsator valve. The bar $v$ is slotted and is secured to frame $r$ by means of screws $u$. When the stud $p$ is adjusted vertically it is necessary to correspondingly adjust longitudinally the bar $v$ in order that its forked flange $w$ may properly engage the disc $x$.

Figure 2:
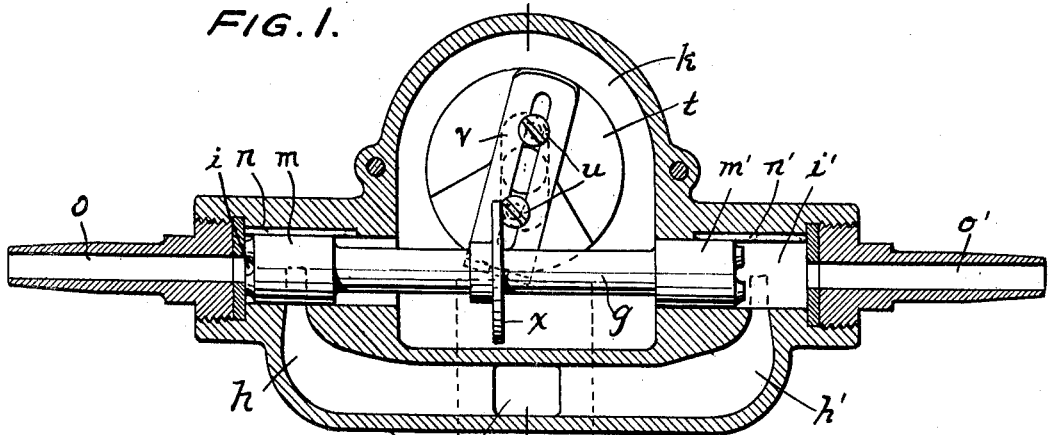
Figure 2 is a vertical horizontal section through the pulsator.

Assume that the parts are in the position shown (most clearly in Figure 2) and that the interior of cup $b$ and the passages $f$, $h$, $h'$ are in constant communication with vacuum. The air chamber $k$ being in constant communication with the atmosphere, air flows through groove $n$ and into the space $i$ and the atmospheric pressure on piston head $m$ overcoming the subatmospheric pressure on piston head $m'$, plus the resistance to movement of frame $t$, the piston valve shifts to the right. At the same time frame $t$ is swung on its pivot. When the valve reaches its median position, the air groove $n$ is just closed to admission of air back of valve head $m$ and the port to vacuum passage $h'$ is just closed; while the air groove $n'$ is just about to open to admit air back of valve head $m'$ and the port to vacuum passage $h$ is just about to open. The kinetic energy acquired by the moving parts, namely, principally the frame $t$ and to a lesser degree the valve, suffices to propel the valve to the right against the unbalanced pneumatic forces tending to shift it to the left until the valve completes its movement and reaches a position the reverse of that shown in Fig. 2, whereupon said unbalanced pressures become immediately effective to reverse the movement of the valve.

The described operation is only possible in view of the fact that the frame $t$ acts as a substantially frictionless pendulum; that is, the force that would be required to operate it against no resistance is almost negligible, wherefore, in the construction described, the energy acquired by the pendulum, by reason of the pressure applied to it during the first half of its movement, is approximately that required to complete the last half of its movement while opposed by a pressure approximately equal to that applied to it during the first half of its movement.

The rate at which the frame $t$ will oscillate varies with its oscillatory period, which may be varied by adjusting the oscillatory frame.

Nozzles o and o' may be connected with the two pulsation chambers y, y' of a claw z, each of these chambers having two nozzles adapted for connection with the pulsation chambers of two double chambered teat cups (not shown).

From the foregoing description it will be understood that pneumatic pulsations are produced in both chambers y and y' of claw z, each chamber being connected with high pressure when the other is connected with low pressure.

Figure 1:
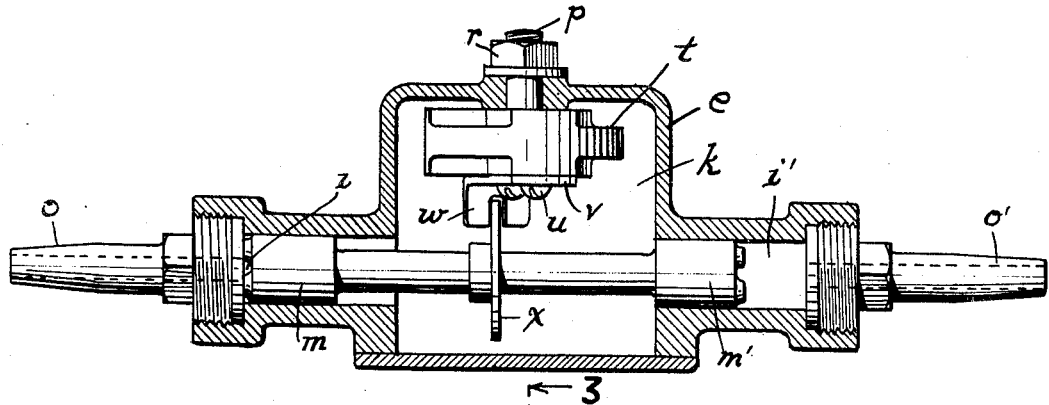
Figure 1 is a horizontal longitudinal section through the pulsator.
Figure 3:
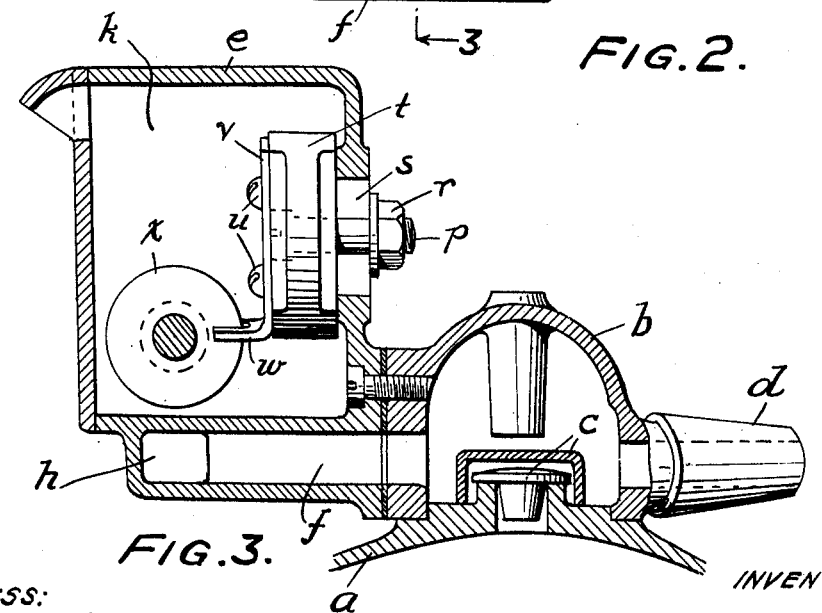
Figure 3 is a cross-sectional view, on line 3—3 of Figure 2, of the pulsator and of the top of the milk pail.
Figure 4:
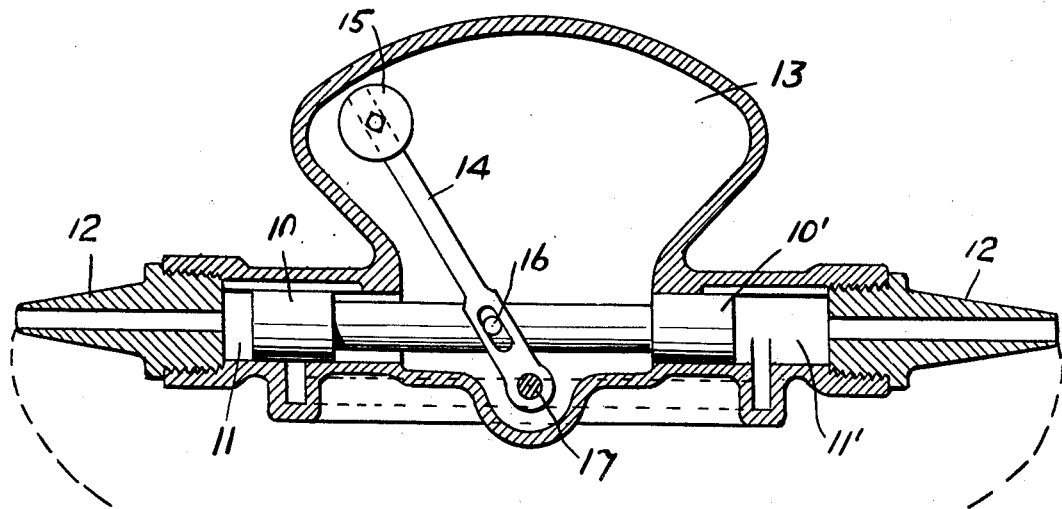
Figure 4 shows a longitudinal section of a modification and a longitudinal section through a claw.
Figure 4:
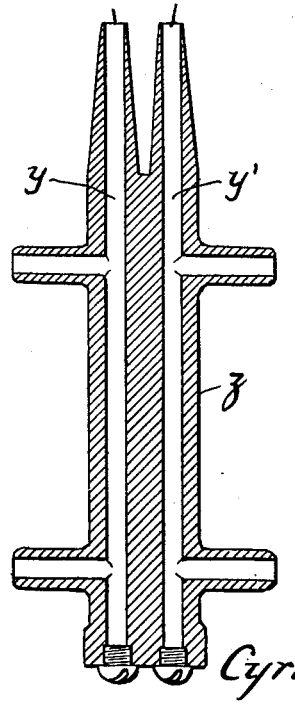

In Figure 4 is shown a modification wherein the heads 10 and 10' of a piston valve slide in piston chambers 11 and 11' which at their ends are provided with mouths in which are threaded nozzles 12 adapted to be connected with hose which may be connected with the pulsation chambers y and y' of the claw z. The piston chambers 11 and 11' open into a central air chamber 13 wherein is adapted to swing an inverted pendulum whose operation is substantially the same as the operation of the oscillatory device shown in Figs. 1, 2 and 3. The pendulum comprises a lever 14, pivoted at 17, having a pin and slot connection 16 with the stem of the piston valve 10 and a weight 15 which is adjustable along the lever 14.

Having now fully described my invention, what I claim and desire to protect by Letters Patent is:

1. A pneumatic pulsator for milking machines comprising a pair of pulsation pipes, pulsation means comprising ports, passages and a reciprocable pulsation piston valve, said piston valve adapted in one position to connect one end of the piston valve and one pulsation pipe with a source of relatively high pressure and the other end of the valve and the other pulsation pipe with a source of relatively low pressure and adapted in its opposite position to reverse said connections, and an oscillatory member connected with and operable by said piston valve to be swung thereby from one end position toward its other end position and by its momentum to complete its oscillatory movement and thereby complete the shift of the piston valve.

2. A pneumatic pulsator for milking machines comprising a pair of pulsation pipes, a pipe adapted for connection with a source of relatively low pressure and a reciprocable pulsation piston valve adapted in one position to connect one pulsation pipe with a source of higher pressure and the other pulsation pipe with the low pressure pipe and in its opposite position to reverse said connection and being movable by unbalanced pneumatic pressures from each of said positions toward the other position, and an oscillatable member connected with and operable by said piston valve to be swung thereby from one end position toward its other end position and by its momentum to complete its oscillatory movement and thereby shift the piston valve to its said other position.

3. An automatic pneumatic pulsator for milking machines comprising a casing provided with end piston chambers each having a port adapted for connection with a source of relatively low pressure and a pulsation port and a central chamber open to a source of relatively high pressure, a piston valve comprising end heads reciprocable in said piston chambers and a connecting stem extending through said central chamber, there being air passages opening into said piston chambers respectively, each end head adapted, in the reciprocation of the piston valve, to connect the end of the corresponding piston chamber alternately with its low pressure port and, through the corresponding air passage, with said high pressure chamber, the two end heads adapted, in each end position of the piston valve, to make opposite pneumatic connections, and an oscillatable member connected with said piston valve and adapted, in each stroke of the piston valve, to be swung by said piston valve from one end position toward its other end position and by its momentum to complete its oscillatory movement and thereby complete the reciprocatory movement of the piston valve.

CYRUS HOWARD HAPGOOD.